United States Patent
Mogamiya (10) Patent No.: US 7,847,824 B2
(45) Date of Patent: Dec. 7, 2010

(54) SHAKE CORRECTION APPARATUS OF A CAMERA

(75) Inventor: Makoto Mogamiya, Tokyo (JP)

(73) Assignee: Hoya Corporation, Tokyo (JP)

( * ) Notice: Subject to any disclaimer, the term of this patent is extended or adjusted under 35 U.S.C. 154(b) by 449 days.

(21) Appl. No.: 12/046,668

(22) Filed: Mar. 12, 2008

(65) Prior Publication Data

US 2008/0225126 A1    Sep. 18, 2008

(30) Foreign Application Priority Data

Mar. 14, 2007    (JP)    ............ 2007-064394

(51) Int. Cl.
- H04N 5/228    (2006.01)
- G03B 17/00    (2006.01)
- H02K 41/02    (2006.01)

(52) U.S. Cl. .......... 348/208.7; 348/208.4; 396/54; 310/12.05

(58) Field of Classification Search ............ 348/208.99, 348/208.2, 208.4, 208.5, 208.7; 396/52, 396/54, 55; 310/12.05, 12.06
See application file for complete search history.

(56) References Cited

U.S. PATENT DOCUMENTS

| | | | |
|---|---|---|---|
| 6,900,843 B1 * | 5/2005 | Uchiyama | 348/374 |
| 7,529,476 B2 * | 5/2009 | Kurosawa | 396/55 |
| 2006/0017815 A1 * | 1/2006 | Stavely et al. | 348/208.7 |
| 2006/0070302 A1 * | 4/2006 | Seo | 52/6 |
| 2006/0284495 A1 * | 12/2006 | Seo et al. | 310/12 |
| 2007/0014555 A1 | 1/2007 | Hirunuma et al. | |
| 2007/0222544 A1 * | 9/2007 | Seo | 335/285 |
| 2008/0013939 A1 * | 1/2008 | Ogawa | 396/55 |
| 2008/0151063 A1 * | 6/2008 | Mogamiya | 348/208.2 |

FOREIGN PATENT DOCUMENTS

| | | |
|---|---|---|
| JP | 2006-108956 | 4/2006 |
| JP | 2007-025180 | 2/2007 |
| JP | 2007-025616 | 2/2007 |

OTHER PUBLICATIONS

English language Abstract of JP 2006-108956.
English language Abstract of JP 2007-025180.
English language Abstract of JP 2007-025616.
U.S. Appl. No. 11/961,037 to Mogamiya, which was filed on Dec. 20, 2007.

* cited by examiner

*Primary Examiner*—Sinh Tran
*Assistant Examiner*—Daniel M Pasiewicz
(74) *Attorney, Agent, or Firm*—Greenblum & Bernstein, P.L.C.

(57) ABSTRACT

A shake correction apparatus of a camera, includes a stationary support board; an electrical board movable relative to the stationary support board; an image pickup device supported by the electrical board and including leads made of a magnetic material which are arranged on a periphery of the image pickup device to electrically connect the image pickup device to the electrical board; at least one drive coil which moves with the electrical board; at least one magnet provided on a surface of the stationary support board which faces the electrical board, and positioned around the image pickup device and the leads as viewed from the front thereof, the magnet exerting a magnetic force on the drive coil; and at least one magnetic cover, made of a magnetic substance, for covering a portion of the magnet which faces the leads.

12 Claims, 9 Drawing Sheets

SHAKE CORRECTION APPARATUS OF A CAMERA

BACKGROUND OF THE INVENTION

1. Field of the Invention

The present invention relates to a shake correction apparatus of a camera.

2. Description of the Prior Art

Shake correction apparatuses (shake reduction systems/ image stabilizers) for use in cameras using an image pickup device as an imaging sensor are usually provided with a first stationary support plate fixed to an internal surface of a camera body, a second stationary support plate substantially parallel to the first stationary support plate, and a stage plate positioned between the first and second stationary support plates. The front of the stage plate supports the image pickup device via an electrical board, and the stage plate can move relative to the first and second stationary support plates while maintaining a substantially parallel state relative to the first and second stationary support plates. Additionally, a plurality of stage-member-driving magnets are fixed to a surface of the first stationary support plate which faces the stage plate, while a plurality of drive coils are fixed to a flexible PCB (printed circuit board) integral with the stage plate so as to face the plurality of stage-member-driving magnets in the forward/rearward direction of the camera, respectively.

In this type of shake correction apparatus, passing currents through the drive coils at the occurrence of camera shake caused by hand shake causes each drive coil, through which a current is passed, to produce a driving force for moving the electrical board and the image pickup device. Thereupon, the image pickup device moves in directions to offset the camera shake to thereby correct image shake of an image captured by the image pickup device.

An example of this type of shake correction apparatus of a camera is disclosed in Japanese unexamined patent publication 2006-108956.

When the stage plate to which the image pickup device is mounted is driven to move slidingly through the use of magnetic forces produced by magnets, the following problem occurs. Namely, a great number of leads (signal wires) made of a magnetic material are installed in the periphery of the image pickup device and are electrically connected to an electrical board. However, the leads are bare and therefore may be influenced by magnetic forces produced by the magnets. Accordingly, if the leads are influenced by the magnetic forces, the stage plate (the leads) are attracted toward the magnets thereby, which causes some trouble in the shake-correction performance of the stage plate.

SUMMARY OF THE INVENTION

The present invention provides a shake correction apparatus of a camera which is configured to prevent the leads from being subject to the influence of magnetic forces produced by magnets in an effective manner.

According to an aspect of the present invention, a shake correction apparatus of a camera is provided, including a stationary support board; an electrical board movable relative to the stationary support board; an image pickup device supported by the electrical board and including leads made of a magnetic material which are arranged on a periphery of the image pickup device to electrically connect the image pickup device to the electrical board; at least one drive coil which is mounted on the electrical board positioned around the image pickup device and the leads; at least one magnet provided on the stationary support board which faces the drive coil, the magnet exerting a magnetic force on the drive coil; and at least one magnetic cover, made of a magnetic substance, for covering a portion of the magnet which faces the leads.

Accordingly, a magnetic force produced by the magnet can be prevented from exerting an adverse influence on the leads of the image pickup device in an effective manner because a portion of the magnet which faces the leads is covered by a magnetic cover. Accordingly, the leads of the image pickup device in the shake correction device according to the present invention are less subject to magnetic force than those of a conventional shake correction device having a image pickup device, so that the electrical board can move without hindrance.

It is desirable for the magnetic cover to be a magnetic sheath made from a magnetic material and be fixed to the stationary support board.

It is desirable for the magnetic cover to be a magnetic substance which is coated on the magnet.

It is desirable for the magnetic cover to cover an outer peripheral surface of the magnet. Accordingly, a magnetic force produced by the magnet can be prevented from exerting a bad influence on the leads of the image pickup device in a more effective manner.

It is desirable for the magnet to include at least one X-direction magnet and at least one Y-direction magnet, and for the drive coil to include at least one X-direction drive coil which generates a driving force for moving the electrical board in an X-direction as a specific linear direction upon being supplied with an electric current in a state where the X-direction drive coil receives a magnetic force exerted by the X-direction magnet; and at least one Y-direction drive coil which generates a driving force for moving the electrical board in a Y-direction orthogonal to the X-direction upon being supplied with an electric current in a state where the Y-direction drive coil receives a magnetic force exerted by the Y-direction magnet.

Accordingly, the electrical board and the image pickup device can be driven so as to move in the X-direction and the Y-direction through the use of magnetic force.

It is desirable for the stationary support board to include a front stationary support board and a rear stationary support board which are substantially parallel to each other. The electrical board is positioned between the front stationary support board and the rear stationary support board. The shake correction apparatus further includes a stage plate which moves with the electrical board and includes at least three support holes formed as through-holes; and at least three balls engaged in the support holes to be allowed to rotate therein, respectively, the balls being capable of making contact with the front stationary support board and the rear stationary support board, wherein diameters of the balls are smaller than a distance between opposed surfaces of the front stationary support board and the rear stationary support board.

Accordingly, the electrical board can not only move linearly in the X-direction and the Y-direction relative to the front stationary support board and the rear stationary support board but also rotate in an X-Y axis plane that is substantially parallel to both the X-direction and the Y-direction since at least three balls, which are respectively engaged in the support holes to be allowed to rotate therein, respectively, make contact with the front stationary support board or the rear stationary support board (i.e., each ball does not make contact with the front and rear stationary support boards simultaneously). Accordingly, the shake correction apparatus can also offset so-called rotational image shake.

It is desirable for the shake correction apparatus to include a gyro sensor for detecting deflections of the camera; and a controller which operates to pass current through the X-direction drive coil and the Y-direction drive coil to move the stage member in a manner to compensate camera shake in accordance with information on the deflections detected by the gyro sensor.

Accordingly, a precise shake correcting operation of the shake correction apparatus can be achieved.

It is desirable for at least one side surface of the magnet which faces the camera body to be covered by the magnetic cover.

Accordingly, a magnetic force produced by the magnet does not easily reach a portion of the camera body which faces the magnet from a portion of the magnet which faces the camera body. Therefore, even if an object made of a magnetic substance comes near to the outer surface of the portion of the camera body that faces the portion of the magnet, the object is prevented from being magnetically attracted to the camera body in an effective manner.

It is desirable for the magnet to include at least two pairs of magnets, and for the magnetic cover to include at least two magnetic covers which surround the two pairs of magnets, respectively.

It is desirable for the drive coil to be made as a flat coil lying in a plane parallel to a plane in which the electrical board is movable.

It is desirable for the electrical board to be fixed to a back of the stage plate with the image pickup device projecting forward from the stage plate through a hole formed in a center of the stage plate.

It is desirable for the stationary support board to include a front stationary support board and a rear stationary support board which are substantially parallel to each other. The electrical board is positioned between the front stationary support board and the rear stationary support board. The shake correction apparatus further includes a stage plate which moves with the electrical board and includes at least three support holes formed as through-holes; at least three balls engaged in the support holes to be allowed to rotate therein, respectively; and at least three retainers fixedly fitted into at least three through-holes formed in the front stationary support board, the balls being positioned between the rear stationary support board and rear end surfaces of the retainers, respectively.

The present disclosure relates to subject matter contained in Japanese Patent Application No. 2007-64394 (filed on Mar. 14, 2007) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENT

An embodiment of a shake correction apparatus (image stabilizer/shake reduction system) 20 according to the present invention which is incorporated in a digital camera 10 will be hereinafter discussed with reference to the accompanying drawings. In the following description, the horizontal direction, the vertical direction and the front-back direction of the shake correction apparatus 20 of the digital camera 10 are referred to as an X-direction, a Y-direction and a Z-direction, respectively, as shown by the double-headed arrows shown in FIGS. 1 and 10.

Firstly, the basic structures of the digital camera 10 and the shake correction apparatus 20 will be discussed hereinafter.

Figure 1:
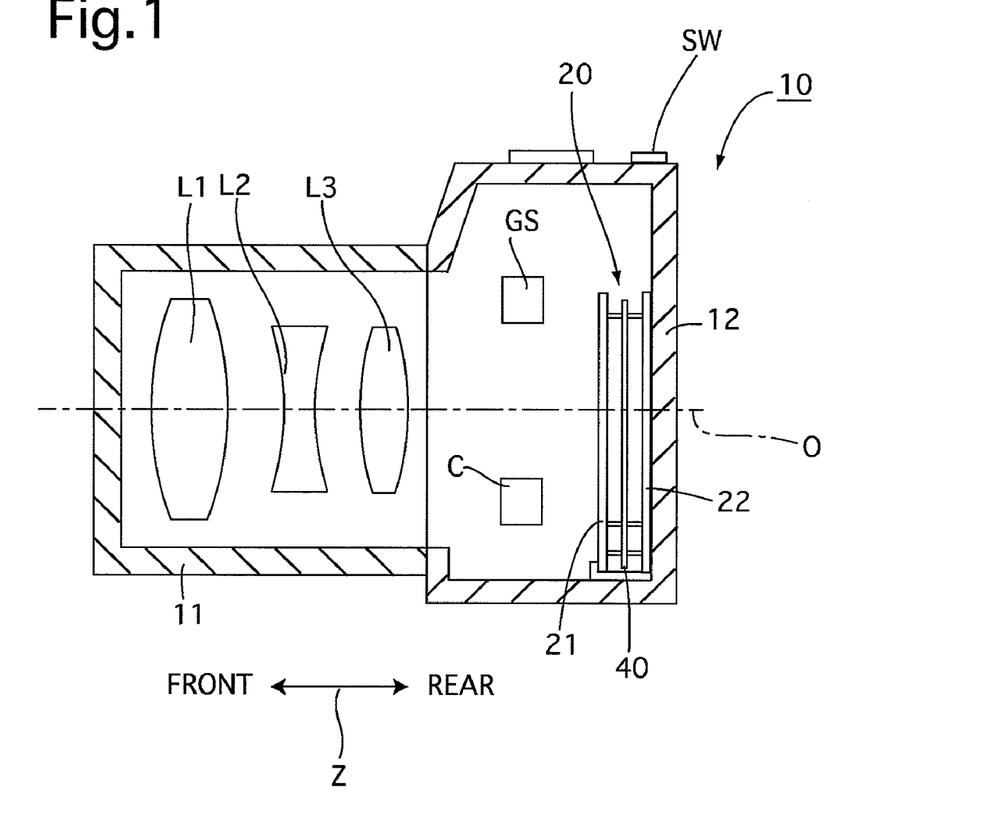
FIG. 1 is a longitudinal sectional view of a digital camera having a shake correcting function.
Figure 2:
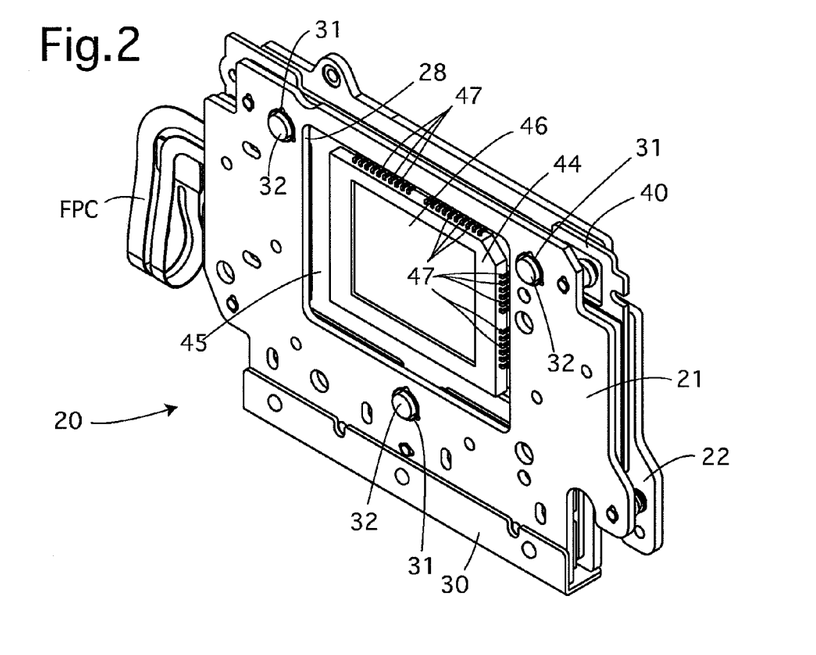
FIG. 2 is a front perspective view of the shake correction apparatus.
Figure 3:
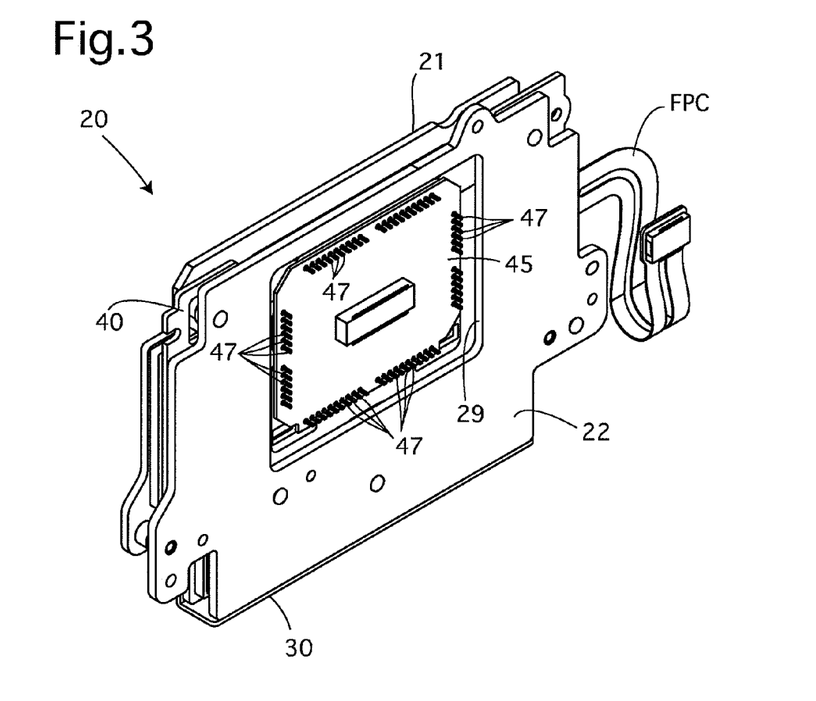
FIG. 3 is a rear perspective view of the shake correction apparatus.
Figure 4:
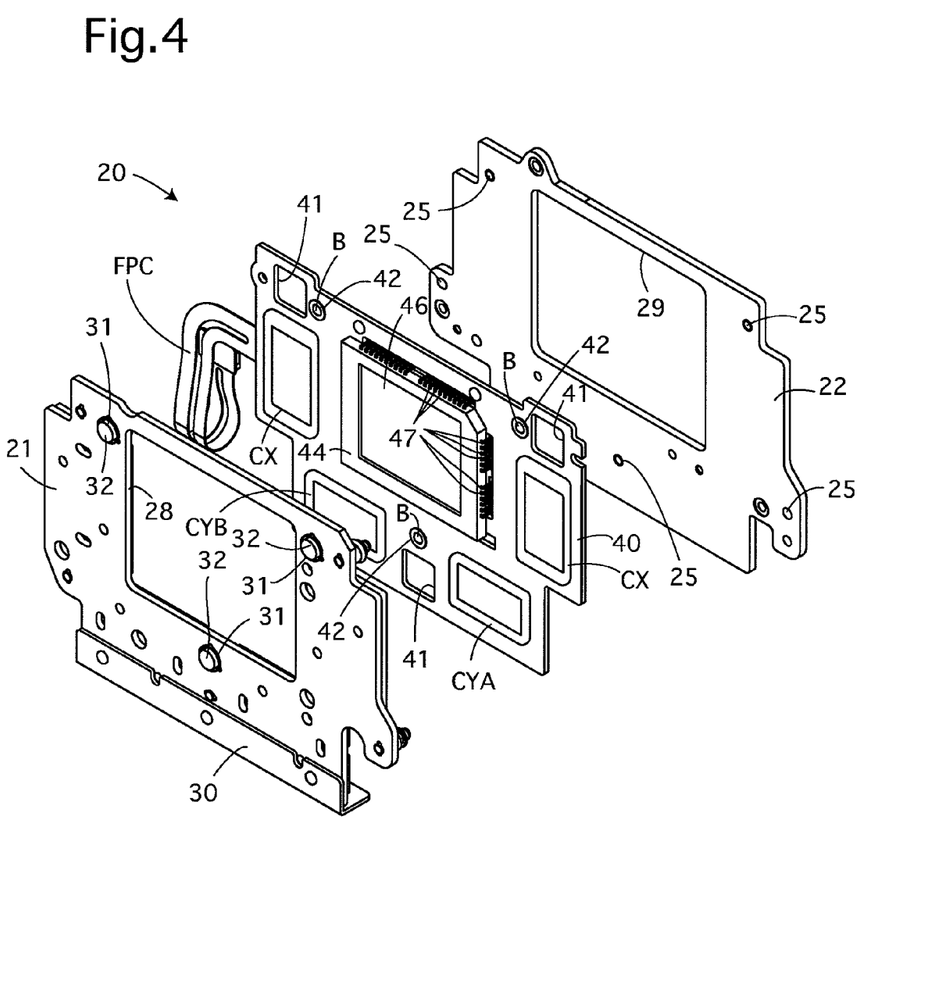
FIG. 4 is an exploded front perspective view of the shake correction apparatus.
Figure 5:
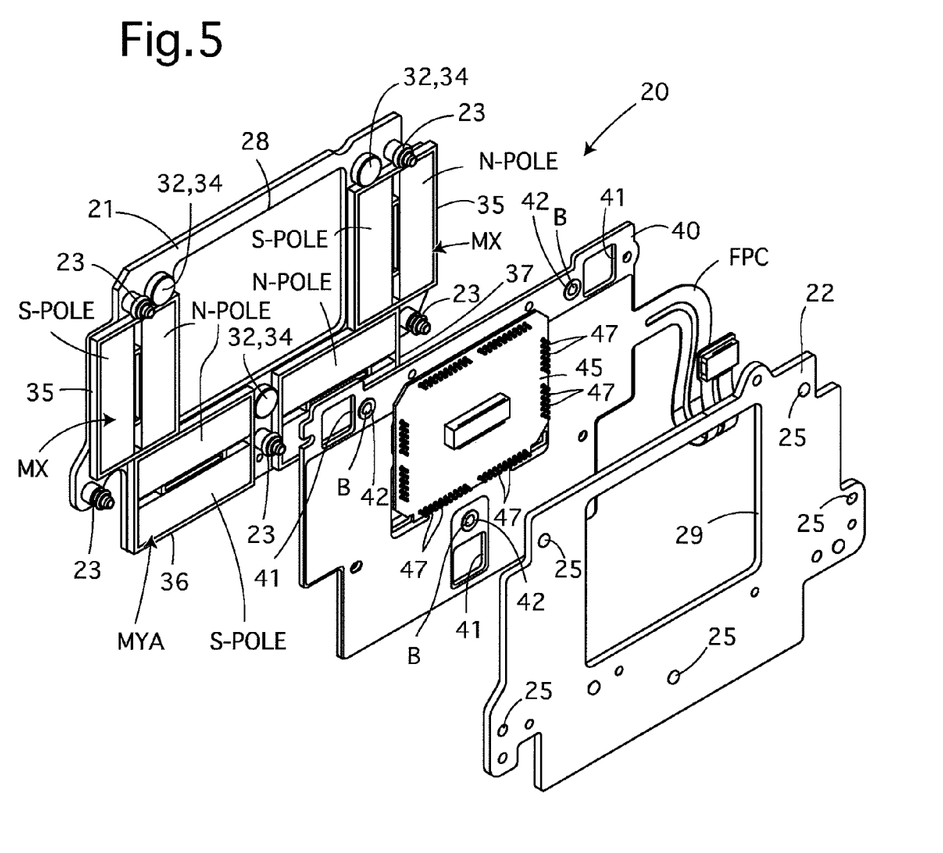
FIG. 5 is an exploded rear perspective view of the shake correction apparatus.
Figure 6:
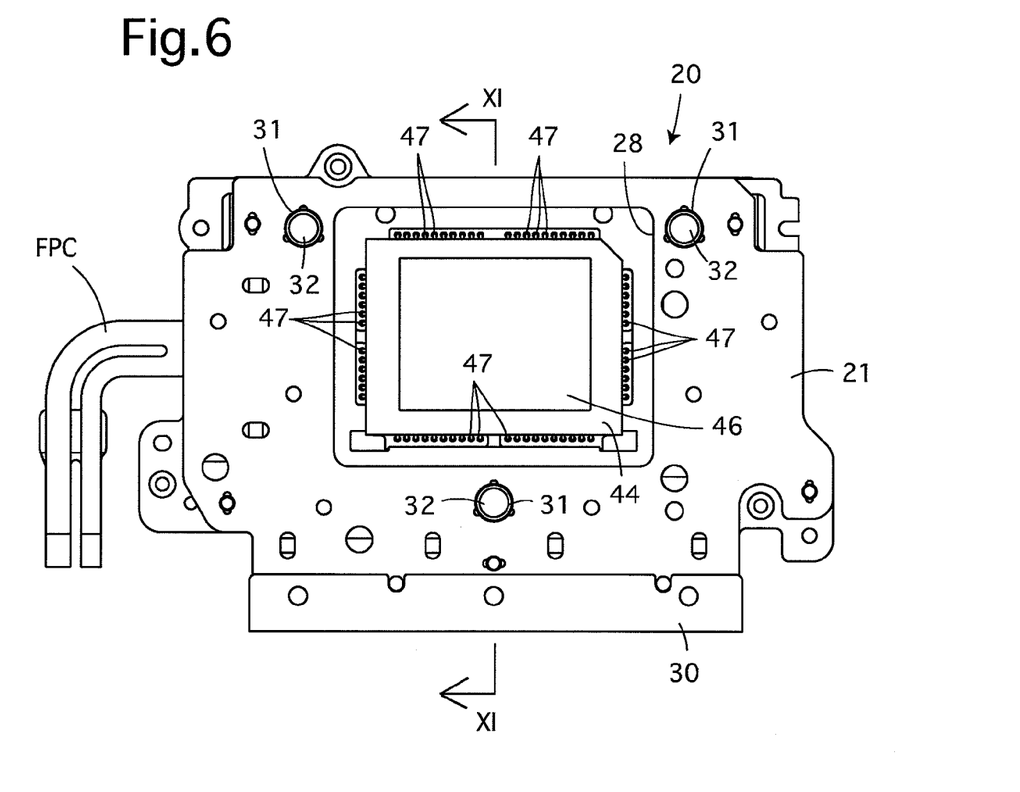
FIG. 6 is a front elevational view of the shake correction apparatus.
Figure 7:
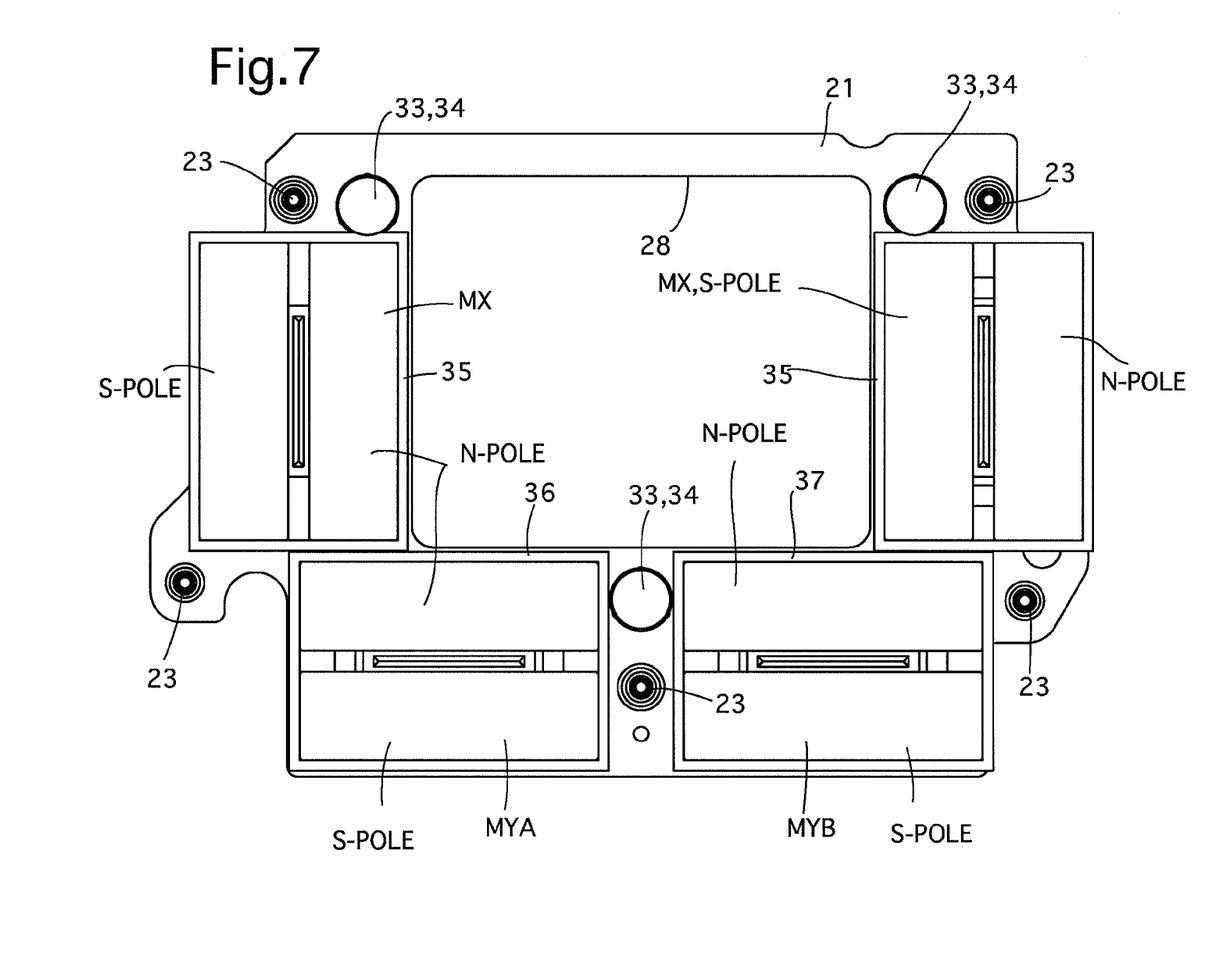
FIG. 7 is a rear elevational view of a front stationary support plate of the shake correction apparatus, and associated elements mounted to the front stationary support plate.

As shown in FIG. 1, a lens barrel 11 of the digital camera 10 is provided therein with a photographing optical system including a plurality of lenses L1, L2 and L3, and is provided, in a camera body 12 behind the rearmost lens L3, with the shake correction apparatus 20.

Figure 8:
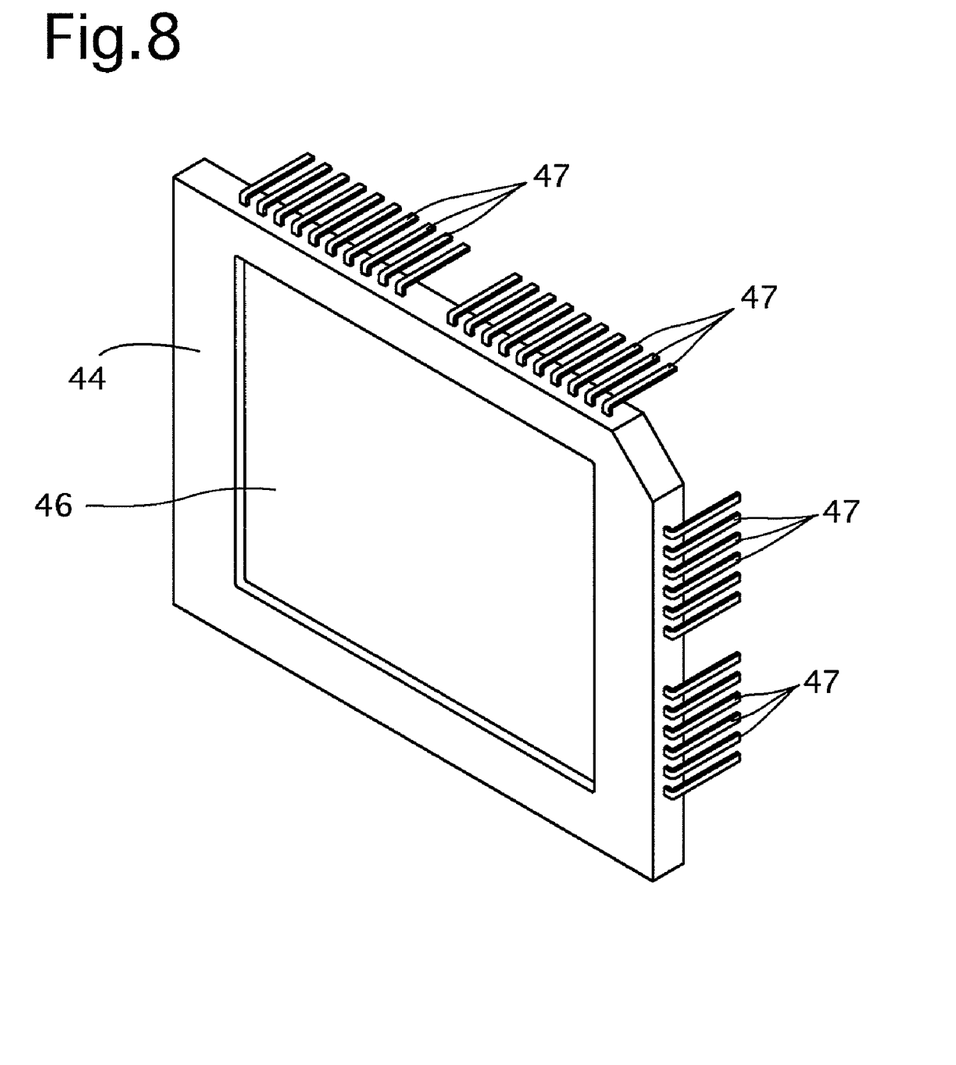
FIG. 8 is a front perspective view of an image pickup device shown in FIGS. 4 and 6.
Figure 9:
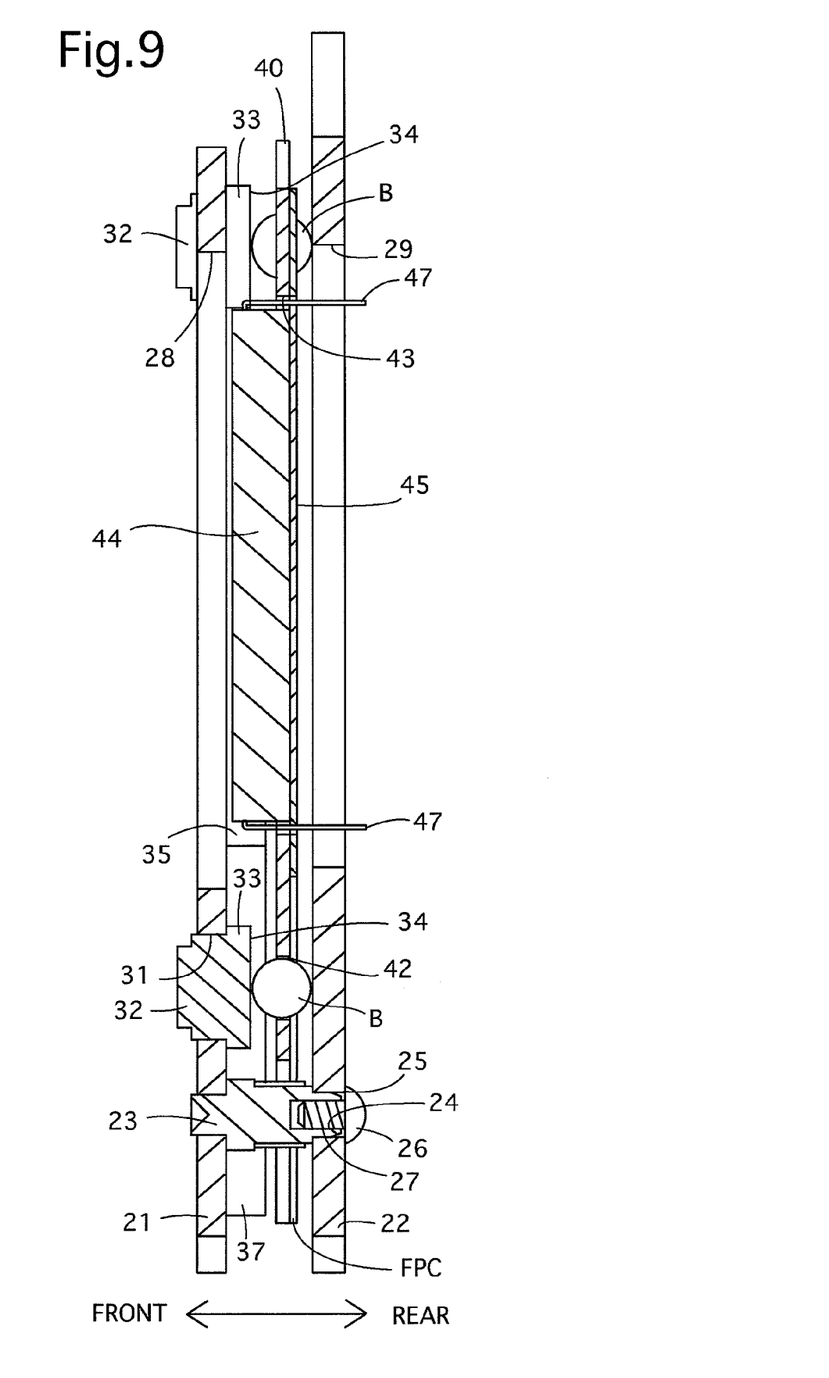
FIG. 9 is a cross sectional view taken along the XI-XI arrows shown in FIG. 6.

As shown in FIGS. 2 through 10, the shake correction apparatus 20 is provided with a front stationary support board (stationary support board) 21 and a rear stationary support board (stationary support board) 22. The front stationary support board 21 is in the shape of a horizontally-elongated rectangle as viewed from the front and is made of a magnetic material such as a soft metal. The rear stationary support board 22 has approximately the same shape and size as the front stationary support board 21 and is also made of a magnetic material such as a soft metal. The front stationary support board 21 is provided, at five different positions on the rear surface thereof, with five connecting columns 23, respectively, which project rearward, and each of the five connecting columns 23 is provided at the rear end surface thereof with a female screw hole 24. The rear stationary support board 22 is provided, at five different position thereon which correspond to the positions of the five connecting columns 23, with five through-holes 25, respectively. As shown in FIG. 9, five set screws 26 (only one of which is shown in FIG. 9), each having a male screw thread portion 27, are inserted into the five through-holes 25, and the male screw thread portions 27 of the five set screws 26 are screwed into the female screw holes 24 of the five connecting columns 23, respectively. Due to the screw engagements of the five set screws 26 with the five connecting columns 23, the front stationary support board 21 and the rear stationary support board 22 are connected so as to be parallel to each other.

The front stationary support board 21 is provided in a central portion thereof with a rectangular hole 28. Likewise, the rear stationary support board 22 is provided in a central portion thereof with a rectangular hole 29. The shake correction apparatus 20 is provided with a lower-end connecting member 30 having an L-shaped cross section which is connected to the front stationary support board 21 so as to cover along the lower ends of the front stationary support board 21 and the rear stationary support board 22. Furthermore, the rear stationary support board 22 is connected to an internal surface of the camera body 12 by three set screws (not shown).

The front stationary support board 21 is provided, at two different positions thereon in the vicinity of the right and left upper corners of the front stationary support board 21 with two fitting holes (through-holes) 31, respectively. The front stationary support board 21 is further provided, at a position thereon in the vicinity of a center of the front stationary support board 21 in the X-direction, with a fitting hole (through-hole) 31 (see FIG. 9). Each fitting hole 31 is circular as viewed from the front. Three retainers 32 are fixedly fitted into the three fitting holes 31 from the back of the front stationary support board 21, respectively (each retainer 32 serves as a part of the front stationary support board 21). The rear ends of the three retainers 32 are formed as large-diameter retaining portions 33 which are greater in diameter than the three fitting holes 31, respectively. The retaining portions 33 are in contact with the back of the front stationary support board 21. Accordingly, the retaining portions 33 of the three retainers 32 do not come out of the three fitting holes 31 from the front thereof, respectively. Additionally, the rear end surfaces of the retaining portions 33 are formed as contacting flat surfaces 34 which are parallel to both the front stationary support board 21 and the rear stationary support board 22.

The shake correction apparatus 20 is provided, on the rear surface of the front stationary support board 21 on the horizontally opposite sides of the rectangular hole 28, with two (right and left) pairs of X-direction magnets MX made of permanent magnets, respectively. The rear half of the left X-direction magnet MX serves as an S-pole and the front half of the left X-direction magnet MX serves as an N-pole, as viewed in FIGS. 5, 7 and 10 (the front half and the rear half of the right magnet as viewed from the front of the shake correction apparatus 20). Similarly, the rear half of the right X-direction magnet MX serves as an N-pole and the front half of the right X-direction magnet MX serves as an S-pole, as viewed in FIGS. 5, 7 and 10 (the front half and the rear half of the left magnet as viewed from the front of the shake correction apparatus 20). The right and left pairs of X-direction magnets MX are aligned in the X-direction, and the positions of the right and left pairs of X-direction magnets MX in the Y-direction are the same. The paths of magnetic flux of the right and left pairs of X-direction magnets MX through the front stationary support board 21 and the rear stationary support board 22 form two X-direction magnetic circuits between the two X-direction magnets MX and two portions of the rear stationary support board 22 which face the two X-direction magnets MX in the Z-direction, respectively.

The shake correction apparatus 20 is further provided, on the rear surface of the front stationary support board 21 below the rectangular hole 28, with two (upper and lower) pairs of Y-direction magnets MYA and MYB made of permanent magnets which are arranged side by side in the horizontal direction, i.e., the X-direction. In each pair of Y-direction magnets MYA and MYB, the rear half of the upper magnet serves as an N-pole and the front half of the upper magnet serves as an S-pole, as viewed in FIGS. 5, 7 and 11, and the rear half of the lower magnet serves as an S-pole and the front half of the lower magnet serves as an N-pole, as viewed in FIGS. 5, 7 and 11. The paths of magnetic flux of the right and left pairs of Y-direction magnets MYA and MYB through the front stationary support board 21 and the rear stationary support board 22 form two Y-direction magnetic circuits between the two Y-direction magnets MYA and MYB and two portions of the rear stationary support board 22 which face the two Y-direction magnets MYA and MYB in the Z-direction, respectively.

Accordingly, the front stationary support board 21 and the rear stationary support board 22 function as yokes.

The shake correction apparatus 20 is provided on the periphery of each pair of X-direction magnets MX with a magnetic sheath (magnetic cover) 35 made of a magnetic material such as metal which is in the shape of a rectangle as viewed from the front of the shake correction apparatus 20, and the inner peripheral surface of each magnetic sheath 35 is fixed to peripheral surfaces (outer edges) of the associated pair of X-direction magnets MX. Likewise, the shake correction apparatus 20 is provided on the periphery of the left pair of Y-direction magnet MYA with a magnetic sheath (magnetic cover) 36 made of a magnetic material such as metal which is in the shape of a rectangle as viewed from the front of the shake correction apparatus 20, and the inner peripheral surface of the magnetic sheath 36 is fixed to peripheral surfaces (outer edges) of the pair of Y-direction magnets MYA. Likewise, the shake correction apparatus 20 is provided on the periphery of the right pair of Y-direction magnets MYB with a magnetic sheath (magnetic cover) 37 made of a magnetic material such as metal which is in the shape of a rectangle as viewed from the front of the shake correction apparatus 20, and the inner peripheral surface of the magnetic sheath 37 is fixed to peripheral surfaces (outer edges) of the pair of Y-direction magnets MYB. The front surfaces of all the four magnetic sheaths 35, 36 and 37 are fixed to the back of the front stationary support board 21.

Figure 10:
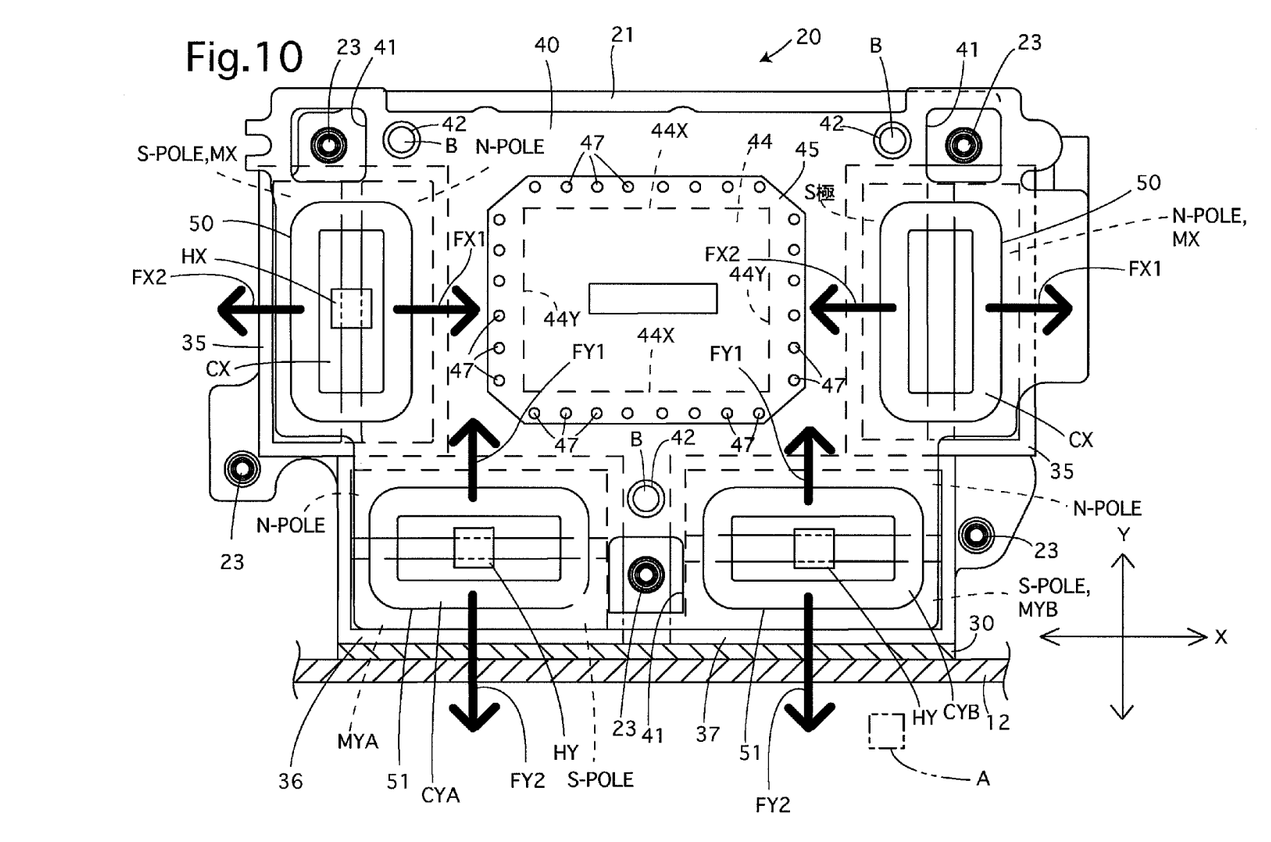
FIG. 10 is a rear elevational view of the shake correction apparatus with both a rear stationary support plate and a flexible PCB being removed for clarity.

The shake correction apparatus 20 is provided between the front stationary support board 21 and the rear stationary support board 22 with a stage plate 40. The stage plate 40 is provided in the upper right corner and the upper left corner thereof with two moving range limit holes 41, respectively, and is further provided, at the lower end of the stage plate 40 at the center in the horizontal direction, with one moving range limit hole 41. Each of the three moving range limit holes 41 is substantially rectangular in shape. As shown in FIG. 10, two of the five connecting columns 23 which project from the front stationary support board 21 in the vicinity of the right and left upper corners thereof pass through the aforementioned two moving range limit holes 41 of the stage plate 40 in the Z-direction, respectively, while one of the five connecting columns 23 which projects from the lower end of the front stationary support board 21 at the horizontal center thereof passes through the aforementioned one moving range limit recess 41 of the stage plate 40 in the Z-direction.

The stage plate 40 is provided, at three different positions thereon which face the three retainers 32 (the contacting flat surfaces 34) in the Z-direction, with three support holes (through-holes) 42, respectively, each of which is circular in shape as viewed from the front. Three balls B are inserted into the three support holes 42 to be rotatable therein, respectively. The diameters of the three balls B are slightly smaller than the distance between the contacting flat surfaces 34 and the surface of the rear stationary support board 22 which face the contacting flat surfaces 34 in the Z-direction; and accordingly, each ball B does not come into contact with the contacting flat surface 34 of the associated retainer 32 and the front surface of the rear stationary support board 22, which is parallel to the contacting flat surface 34, simultaneously.

Since the three balls B are in contact with the contacting flat surfaces 34 of the three retainers 32 and the front surface of the rear stationary support board 22 in this manner, the stage plate 40 can not only move linearly in the X-direction and the Y-direction relative to the front stationary support board 21 and the rear stationary support board 22 but also rotate in an X-Y axis plane that is parallel to both the X-direction and the Y-direction (i.e., that is orthogonal to the optical axis O) from the initial position of the stage plate 40 that is shown in FIG. 10.

Additionally, since three of the five connecting columns 23 that project from the front stationary support board 21 are loosely engaged in the three moving range limit holes 41 of the stage plate 40, respectively, the range of sliding movement of the stage plate 40 and an electrical board 45 (on which an image pickup device 44 is mounted) is limited by the three connecting columns 23 and the three moving range limit holes 41.

The stage plate 40 is provided in the center thereof with an image-pickup-device mounting hole 43 formed as a through-hole that is rectangular in shape as viewed from the front (see FIG. 9). As shown in FIG. 9, the image pickup device 44 is fixed to the electrical board 45 on a central portion of the front surface thereof, and the electrical board 45 is fixed to the back of the stage plate 40 with the image pickup device 44 projecting forward from the stage plate 40 through the image-pickup-device mounting hole 43. The stage plate 40 and the electrical board 45 that is fixed to the back of the stage plate 40 serves as a movable stage which is integral with the image pickup device 44.

As shown in FIG. 8, the image pickup device 44 is provided on the front thereof with an imaging surface 46. In addition, the image pickup device 44 is provided around the imaging surface 46 with a large number of leads (signal lines) 47 which project rearward from the outer edge of the image pickup device 44.

The imaging surface 46 of the image pickup device 44 is an image-forming surface on which object light which is passed through the lenses L1, L2 and L3 is formed as an object image. When the stage plate 40 is in the initial position (when the stage plate 40 is in the state shown in FIG. 10), the center of the imaging surface 46 of the image pickup device 44 is positioned on an optical axis O of the lenses L1, L2 and L3. As shown in FIG. 10, the image pickup device 44 is provided with a pair of X-direction edges (upper and lower X-direction edges) 44X which extend parallel to each other in the X-direction and a pair of Y-direction edges (right and left Y-direction edges) 44Y which extend parallel to each other in the Y-direction when the stage plate 40 is in the position (initial position) shown in FIG. 10.

The leads 47 of the image pickup device 44 that serve as imaging-signal transmission devices are made of a magnetic material. The leads 47 project rearward from the electrical board 45 through a corresponding number of through-holes (not shown) formed in the electrical board 45, respectively. Each lead 47 is electrically connected to an electrical circuit (not shown) and a flexible printed circuit board FPC. As shown in FIGS. 9 and 10, the three magnetic sheaths 35, 36 and 37 are positioned around the image pickup device 44 (i.e., around the leads 47). More specifically, the two magnetic sheaths 35 are positioned on the horizontally opposite sides of the image pickup device 44, while the two magnetic sheaths 36 and 37 are positioned below the image pickup device 44.

The flexible printed circuit board FPC which is shaped to be prevented from interfering with the electrical board 45 is fixed to the back of the stage plate 40. The flexible printed circuit board FPC is electrically connected to a controller C (see FIG. 1) which is constructed from a CPU or the like incorporated in the camera body 12.

As shown in FIG. 10, the stage plate 40 is provided on the horizontally opposite sides of the image pickup device 44 with a pair of coil mounting holes (through-holes) 50 that are vertically elongated, respectively, and is further provided below the image pickup device 44 with a pair of (right and left) coil mounting holes (through-holes) 51 that are horizontally-elongated.

Two X-direction drive coils (flat coils/drive coils) CX having the same specifications are fixedly mounted on the front surface of the flexible printed circuit board FPC at the horizontally opposite ends of the stage plate 40 and fitted in the pair of coil mounting holes 50, respectively. The two X-direction drive coils CX lie in a plane parallel to an X-Y axis plane and are aligned in a direction parallel to the pair of X-direction edges 44X of the image pickup device 44 (i.e., in the X-direction in the state shown in FIG. 10). In other words, the positions of the two X-direction drive coils CX in the direction parallel to the pair of Y-direction edges 44Y (in the Y-direction in the state shown in FIG. 10) are coincident with each other. Each X-direction drive coil CX is rectangularly coiled (both in the direction parallel to the stage plate 40 and in the direction of thickness of the stage plate 40) to have over one hundred turns. The two X-direction drive coils CX are positioned to correspond to the aforementioned two X-direction magnetic circuits (the front stationary support board 21, the rear stationary support board 22 and the two X-direction magnets MX), respectively. In other words, the two X-direction drive coils CX are positioned to face the two X-direction magnets MX in the Z-direction, respectively.

Two Y-direction drive coils (flat coils/drive coils) CYA and CYB having the same specifications are fixedly mounted on the front surface of the flexible printed circuit board FPC at the lower end of the stage plate 40 and fitted in the pair of coil mounting holes 51, respectively. The two Y-direction drive coils CYA and CYB lie in a plane parallel to an X-Y axis plane and are aligned in a direction parallel to the pair of X-direction edges 44X of the image pickup device 44 (in the X-direction in the state shown in FIG. 10). In other words, the positions of the two Y-direction drive coils CYA and CYB in the direction parallel to the pair of Y-direction edges 44Y (in the Y-direction in the state shown in FIG. 10) are coincident with each other. Each Y-direction drive coil CYA and CYB is rectangularly coiled (both in the direction parallel to the stage plate 40 and in the direction of thickness of the stage plate 40) to have over one hundred turns. The two Y-direction drive coils CYA and CYB are positioned to correspond to the aforementioned two Y-direction magnetic circuits (the front stationary support board 21, the rear stationary support board 22 and the two Y-direction magnets MY), respectively. In other words, the two Y-direction drive coils CYA and CYB are positioned to face the two Y-direction magnets MY in the Z-direction, respectively.

Additionally, as shown in FIG. 10, an X-direction Hall element HX (see FIG. 10) is fixed to the front surface of the flexible printed circuit board FPC to be positioned inside the left X-direction drive coil CX, and two Y-direction Hall elements HY are fixed to the front surface of the flexible printed circuit board FPC to be positioned inside the two Y-direction drive coils CYA and CYB, respectively.

The two X-direction drive coils CX, the two Y-direction drive coils CYA and CYB, the X-direction Hall element HX and the two Y-direction Hall elements HY are all electrically connected to the controller C (incorporated in the camera body 12) via the flexible printed circuit board FPC.

The shake correction apparatus 20 carries out a shake correction operation (image stabilizing operation) so as to offset image shake by passing currents through the two X-direction drive coils CX and the two Y-direction drive coil CYA and CYB from the controller C.

More specifically, if camera shake (deflections) in the X-direction or the Y-direction, which is caused by hand shake, occurs upon a camera shake correction switch SW (see FIG. 1) provided on the camera body 12 is depressed (in an ON state), a gyro sensor GS (deflection sensor; see FIG. 1) incorporated in the digital camera 10 detects the angular velocity in the X-direction and the angular velocity in the Y-direction. Thereupon, based on data on these angular velocities, the controller C calculates the moving distance (amount of camera shake) in the X-direction and the moving distance (amount of camera shake) in the Y-direction, and passes current through at least one of the two X-direction drive coils CX and the two Y-direction drive coil CYA and CYB. Thereupon, at least one of the two X-direction drive coils CX and the two Y-direction drive coil CYA and CYB generates a driving force in associated one of the driving directions (FX1 or FX2, or FY1 or FY2) shown by the thick-line arrows in FIG. 10 to move the image pickup device 44 (the stage plate 40) linearly in the X-direction or the Y-direction relative to the camera body 12 in the direction opposite to the direction of the camera shake by a moving distance identical to the amount of the camera shake, and accordingly, the effects of shake of the image pickup device 44 (image shake) that is caused by hand shake or the like are compensated (corrected). Note that the moving distances of the stage plate 40 in the X-direction and the Y-direction are detected by the X-direction Hall element HX and the two Y-direction Hall elements HY.

As described above, in the present embodiment of the shake correction apparatus, portions of the leads 47 which are arranged about the periphery of the image pickup device 44 and positioned in front of the electrical board 45 face peripheral surfaces (outer edges) of the two pairs of X-direction magnets MX and the two pairs of Y-direction magnets MYA and MYB. However, since these peripheral surfaces of the two pairs of X-direction magnets MX and the two pairs of Y-direction magnets MYA and MYB are covered by the four magnetic sheaths 35, 36 and 37, no magnetic force leaks from any of these peripheral surfaces (or the amount of leakage of the magnetic force is reduced significantly), which prevents magnetic forces produced by the two pairs of X-direction magnets MX and the two pairs of Y-direction magnets MYA and MYB from exerting an adverse influence on the leads 47 in an effective manner.

Additionally, in the present embodiment of the shake correction apparatus, magnetic forces produced by the two pairs of X-direction magnets MX and the two pairs of Y-direction magnets MYA and MYB are prevented from exerting an adverse influence on electronic devices such as the aforementioned CPU that serves as the controller C other than the image pickup device 44 in an effective manner since the peripheral surfaces of the two pairs of X-direction magnets MX and the two pairs of Y-direction magnets MYA and MYB are totally surrounded and covered by the four magnetic sheaths 35, 36 and 37.

Additionally, magnetic forces produced by the two pairs of X-direction magnets MX and the two pairs of Y-direction magnets MYA and MYB are prevented from leaking outwards through the bottom of the camera body 12 since the bottom surfaces of the two pairs of Y-direction magnets MYA and MYB are covered by the two magnetic sheaths 36 and 37, though being close to the bottom of the camera body 12 as shown in FIG. 10. Therefore, even if an object A (see FIG. 10) made of a magnetic substance comes near to the bottom of the camera body 12 from the outside thereof as shown in FIG. 10, there is no possibility of the object A being magnetically attracted to the bottom of the camera body 12.

In addition, a problem with metal screws (not shown), for, e.g., fixing the shake correction apparatus 20 to the camera body 12, being magnetically attracted to the bottom of the lower-end connecting member 30 to thereby interfere with the operation installing the shake correction apparatus 20 to the camera body 12 during this installing operation can be prevented from occurring.

Although the present invention has been discussed with reference to the above described embodiment of the shake correction apparatus, the present invention is not limited solely to this particular embodiment; making various modifications to the shake correction apparatus is possible.

For instance, instead of providing the magnetic sheaths 35, 36 and 37, the peripheral surface of each pair of X-direction magnet MX and the peripheral surface of each pair of Y-direction magnets MYA and MYB can be plated with a magnetic substance (i.e., coated with a layer of magnetic substance), e.g., electroless nickel plating treated with heat at a high temperature, and leakage of magnetic forces from the peripheral surfaces can be prevented by such a plating or a layer of a magnetic substance.

In addition, the number of the retainers 32 and the number of the balls B can be more than three.

Furthermore, it is possible that all the fitting holes 31 and the retainers 32 be omitted so that the balls B are made to contact the rear surface of the front stationary support board 21 to be allowed to rotate. In this case, the diameters of the balls B are determined to be slightly smaller than the distance between the front stationary support board 21 and the rear stationary support board 22 in the Z-direction.

Although the present invention has been applied to the above described embodiment of the shake correction apparatus 20, in which the stage plate 40 (and the electrical board 45) is rotatable, the present invention can also be applied to a conventional shake correction apparatus in which a stage plate and an electrical board (which correspond to the stage plate 40 and the electrical board 45, respectively) move only linearly in the X-direction and the Y-direction, and can even be applied to a stage apparatus used for a different purpose other than the purpose of correcting image shake (e.g., a stage apparatus in which a specific member is movable linearly in the X-direction and the Y-direction or rotatable).

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A shake correction apparatus of a camera, comprising:
   a stationary support board;
   an electrical board movable relative to said stationary support board;
   an image pickup device supported by said electrical board and including leads made of a magnetic material which are arranged on a periphery of said image pickup device to electrically connect said image pickup device to the electrical board;
   at least one drive coil which is mounted on said electrical board positioned around said image pickup device and said leads;
   at least one magnet provided on said stationary support board which faces said drive coil, said magnet exerting a magnetic force on said drive coil; and
   at least one magnetic cover, made of a magnetic substance, for covering a portion of said magnet which faces said leads.

2. The shake correction apparatus according to claim 1, wherein said magnetic cover comprises a magnetic sheath made from a magnetic material and is fixed to said stationary support board.

3. The shake correction apparatus according to claim 1, wherein said magnetic cover comprises a magnetic substance which is coated on said magnet.

4. The shake correction apparatus according to claim 1, wherein said magnetic cover covers an outer peripheral surface of said magnet.

5. The shake correction apparatus according to claim 1, wherein said magnet comprises at least one X-direction magnet and at least one Y-direction magnet, and
wherein said drive coil comprises:
at least one X-direction drive coil which generates a driving force for moving said electrical board in an X-direction as a specific linear direction upon being supplied with an electric current in a state where said X-direction drive coil receives a magnetic force exerted by said X-direction magnet; and
at least one Y-direction drive coil which generates a driving force for moving said electrical board in a Y-direction orthogonal to said X-direction upon being supplied with an electric current in a state where said Y-direction drive coil receives a magnetic force exerted by said Y-direction magnet.

6. The shake correction apparatus according to claim 1, wherein said stationary support board comprises a front stationary support board and a rear stationary support board which are substantially parallel to each other,
wherein said electrical board is positioned between said front stationary support board and said rear stationary support board, and
wherein said shake correction apparatus further comprises:
a stage plate which moves with said electrical board and includes at least three support holes formed as through-holes; and
at least three balls engaged in said support holes to be allowed to rotate therein, respectively, said balls being capable of making contact with said front stationary support board and said rear stationary support board, wherein diameters of said balls are smaller than a distance between opposed surfaces of said front stationary support board and said rear stationary support board.

7. The shake correction apparatus according to claim 5, further comprising:
a gyro sensor for detecting deflections of said camera; and
a controller which operates to pass current through said X-direction drive coil and said Y-direction drive coil to move said stage member in a manner to compensate camera shake in accordance with information on said deflections detected by said gyro sensor.

8. The shake correction apparatus according to claim 1, wherein at least one side surface of said magnet which faces said camera body is covered by said magnetic cover.

9. The shake correction apparatus according to claim 1, wherein said magnet comprises at least two pairs of magnets, and
wherein said magnetic cover comprises at least two magnetic covers which surround said two pairs of magnets, respectively.

10. The shake correction apparatus according to claim 1, wherein said drive coil is made as a flat coil lying in a plane parallel to a plane in which said electrical board is movable.

11. The shake correction apparatus according to claim 6, wherein said electrical board is fixed to a back of said stage plate with said image pickup device projecting forward from said stage plate through a hole formed in a center of said stage plate.

12. The shake correction apparatus according to claim 1, wherein said stationary support board comprises a front stationary support board and a rear stationary support board which are substantially parallel to each other,
wherein said electrical board is positioned between said front stationary support board and said rear stationary support board,
wherein said shake correction apparatus further comprises:
a stage plate which moves with said electrical board and includes at least three support holes formed as through-holes;
at least three balls engaged in said support holes to be allowed to rotate therein, respectively; and
at least three retainers fixedly fitted into at least three through-holes formed in said front stationary support board, said balls being positioned between said rear stationary support board and rear end surfaces of said retainers, respectively.

* * * * *